United States Patent [19]
Tolochko et al.

[11] 3,783,595
[45] Jan. 8, 1974

[54] GRAPE HARVESTER

[76] Inventors: Cheslav Stanislavovich Tolochko, ulitsa Budennovskaya 203/2, kv. 17; Vladimir Ivanovich Popov, ulitsa Budennovskaya 203/2, kv. 9, both of Novocherkassk; Miron Vasilievich Tsitsiv, ulitsa narodnaya, 14, Kishinev; Alexandr Nikolaevic Varfolomeev, Kotovskoe Shosse, 226, kv. 16, Kishinev; Marlen Mikhailovich Gervolsky, ulitsa Frunze, 9, kv. 3, Kishinev, all of U.S.S.R.

[22] Filed: July 9, 1971

[21] Appl. No.: 161,061

Related U.S. Application Data
[63] Continuation-in-part of Ser. No. 760,811, Sept. 19, 1968, abandoned.

[52] U.S. Cl. .............................. 56/331, A01g/19/00
[58] Field of Search...................... 56/331, 233, 235

[56] References Cited
UNITED STATES PATENTS
2,929,184   3/1960   Lamouria......................... 56/331 X
3,563,016   2/1971   Tolochko et al...................... 56/331

Primary Examiner—Louis G. Mancene
Assistant Examiner—J. N. Eskovitz
Attorney—Eric H. Waters et al.

[57] ABSTRACT

A grape harvester comprising a blade cutting apparatus mounted on a carrier bar so that its longitudinal axis of symmetry forms an acute angle with the plane normal to the direction of movement of chassis; the upper end of said cutting apparatus arranged in front with respect to the direction of the harvester movement in the cutting position. Cutting apparatus is mounted on the carrier bar at another acute angle to the plane superposable upon the espalier canopy.

3 Claims, 4 Drawing Figures

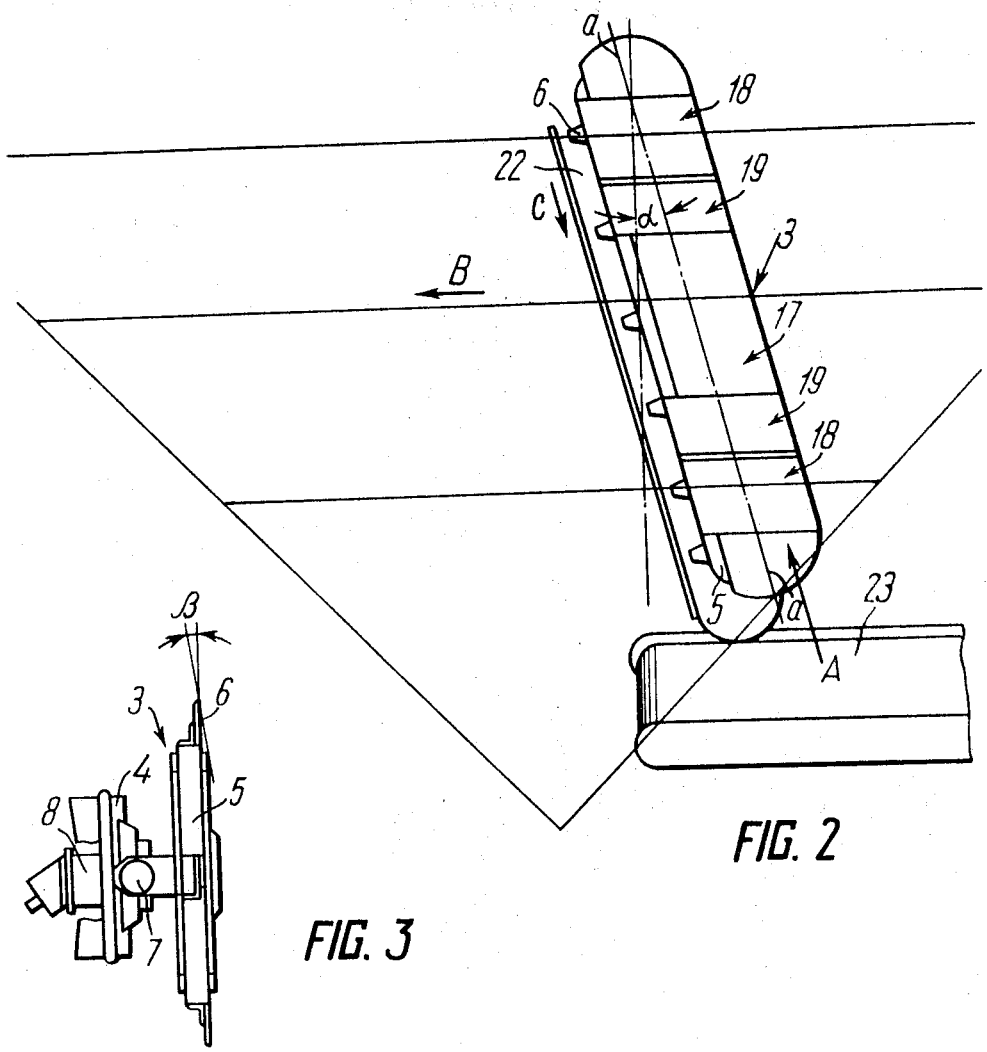

GRAPE HARVESTER

This application is a continuation-in-part of U.S. Pat. application Ser. No. 760,811 filed Sept. 19, 1968 and now abandoned.

The present invention relates to agricultural harvesters and, more particularly, it relates to grape harvesters.

This invention can be most advantageously used for harvesting grapes grown on inclined trellises arranged in rows, however, it can likewise be used for harvesting grapes grown on trellises featuring horizontal extensions from which clusters of grapes hang.

Known in the art are grape harvesters comprising: a chassis for moving between rows in vineyards; a bearing frame arranged on the chassis and carrying a carrier bar mounting a cutting apparatus of the unsupported-cutting type, which means that cutting is effected by cutting members moving at a high speed and striking against loose-hanging clusters of grapes. The cutting apparatus is essentially an endless chain with blades secured thereon, the machine being provided with means adapted to move the cutting apparatus together with the movable bar in horizontal and vertical planes, which is required for following the level of the horizontal canopy whose height varies depending upon the degree of sagging of the trellis wires, as well as for circumventing obstacles such as the trellis uprights (cf., U.S. Pat. No.2,893,194, class 56-331, 1959 ).

Said known grape harvesters cannot be employed for harvesting grapes grown on inclined trellises, since the cutting apparatus of said known harvesters is secured immovably on the movable bar and is only capable of moving when in the horizontal position, which is likely to cause the cutting of grape vines and, consequently, brings about damage to the vineyard and clusters of grapes.

In addition, the known cutting apparatus, due to its horizontal arrangement of the movable bar, causes damage to clusters of grapes in the case of tilting of said apparatus because of irregularities of the soil contour in the spaces between the rows and, consequently, brings about crop losses.

Also, the known cutting apparatus features a thickness exceeding that of the stem of a cluster of grapes, as a result of which clusters of grapes are damaged in the course of cutting and crop losses occur.

It is an object of the present invention to provide a grape harvester capable of harvesting grapes both from trellises having horizontal extensions and from inclined trellises, with minimum crop losses.

It is another object of the present invention to develop a harvester providing for minimum damage to clusters of grapes in the course of harvesting irrespective of the type of espalier (with the exception of vertical espalier) and the brand of grapes.

The above and other objects of the present invention may be accomplished in a grape harvester comprising a chassis carrying a frame on which is secured a bar with a cutting apparatus, said bar being mounted on said frame with a possibility of turning in horizontal and vertical planes, wherein, according to the invention, the cutting apparatus is mounted on the carrier bar so that its longitudinal axis of symmetry form an acute angle ($\alpha$) with a plane normal to the direction of the chassis movement, and the upper end of the cutting apparatus is arranged in front with respect to the direction of the harvester movement in the cutting position; said cutting apparatus being mounted on said bar at an acute angle ($\beta$) to a plane superposable upon the espalier canopy.

Such a structural arrangement provides for harvesting grapes both from trellises featuring horizontal extensions and from vertical trellises, with the minimum damage done to clusters of grapes and, consequently, with minimum crop losses, for the arrangement of the cutting apparatus at the angles $\alpha$ and $\beta$ makes for cutting clusters of grapes across their stems thereby insuring the marketable appearance of the crops.

The angle $\alpha$ is within the range of from 0° to 45° and the angle $\beta$ - from 0° to 25° both angles depending upon the type of espalier, the length of stems of clusters and the brand of grapes.

This invention will be better understood upon considering the following detailed description of a specific embodiment thereof, due reference being had to the accompanying drawings, in which:

FIG. 2 illustrates the cutting apparatus of the harvester shown in FIG.1;

FIG. 3 is a view along arrow A of FIG.2; and

Figure 1:
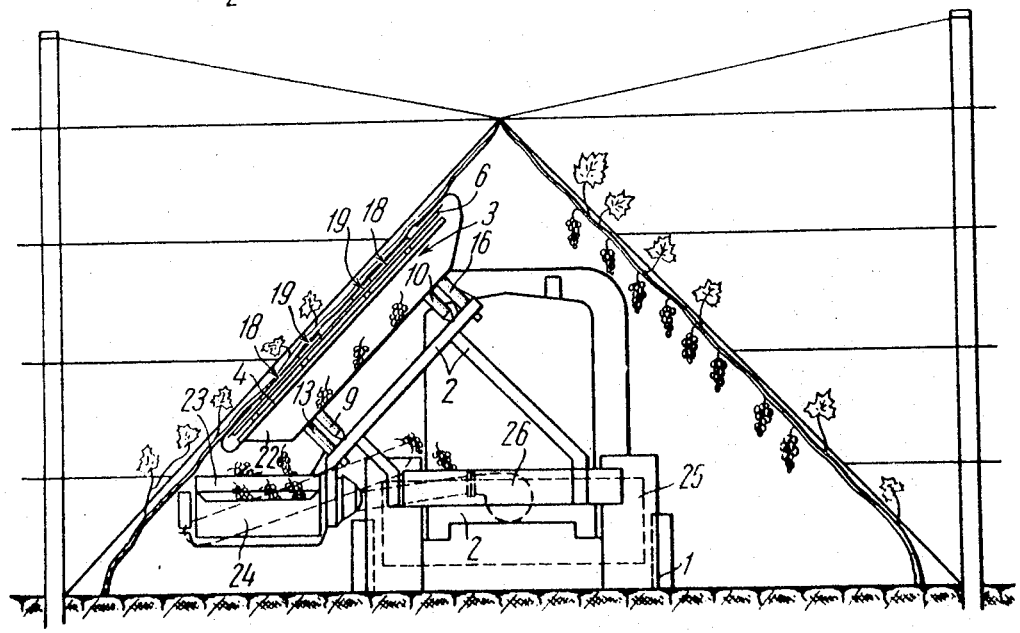
FIG. 1 is a front veiw of the elementary diagram of the harvester according to the present invention.

Referring now to FIGS. 1 and 2 of the drawings, the grape harvester according to the present invention comprises a chassis 1 mounting a frame 2 with a cutting apparatus 3 secured thereon. Said latter apparatus is secured on the frame 2 with the aid of a carried bar 4 and is essentially a closed conveyor 5 having blades 6 secured thereon.

A chain or a belt can be used as the conveyor belt.

The conveyor 5 is mounted on the carried bar so that its longitudinal axis of symmetry, a—a, forms an acute angle $\alpha$ with a plane normal to the direction of the chassis movement (the direction of the chassis movement and that of the conveyor movement are conventionally shown in the drawings with arrows B and C, respectively).

This angle is required to provide for cutting a cluster of grapes across its stem in a downward direction and depends upon the type of espalier (inclined trellises) and the brand of grapes. The value of this angle lies within the range of from 0° to 45° . An increase of the angle $\alpha$ over 45° brings about an increase of the cutting apparatus length, which is structurally inexpedient.

The cutting apparatus 3 (FIG. 3) is secured on the carrier bar 4 at an acute angle $\beta$ to a plane superposable upon the espalier canopy. This angle is required to provide for bringing the cutting edges of the blades 6 under the roots of the stems of clusters of grapes and depends upon the type of espalier and the length of cluster stems. The value of this angle lies in the range from 0° to 25° . An increase of the angle $\beta$ over 25° may cause a possibility of damage to clusters of grapes and complicate the process of following the plane of the espalier canopy. The adjustment of said latter angle within preset limits is effected by turning the cutting apparatus 3 about a pivot 7 secured in the bar 4.

The conveyor 5 is driven by means of a hydraulic motor 8.

For the purpose of taking into account irregularities of the soil contour in spaces between the row, as well as for following the plane of the espalier canopy, the carrier bar 4 (FIG. 4) is mounted on the frame 2 with a possibility of turning in vertical and horizontal planes.

Figure 4:
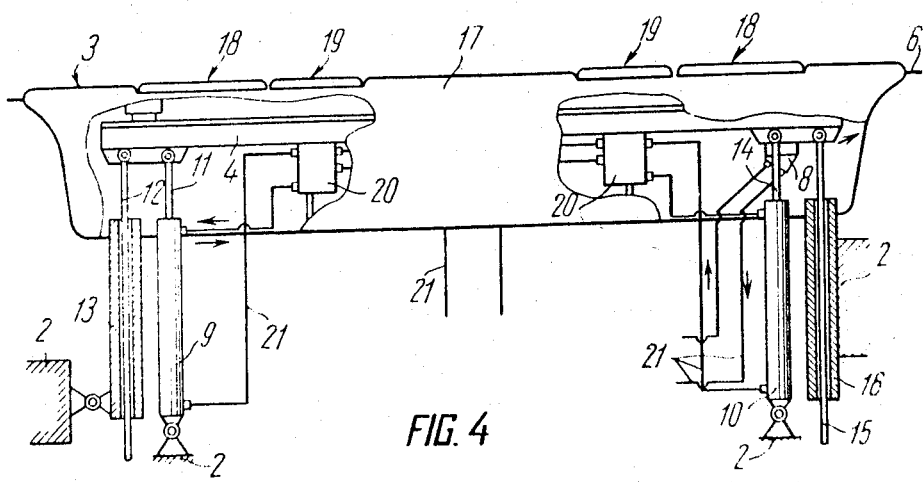
FIG. 4 illustrates the elementary diagram of a means adapted for control of the cutting apparatus shown in FIG.2.

To this end, the bar 4 is secured to the frame 2 with the aid of two hydraulic cylinders 9 and 10 (FIG. 4).

The rod 11 of the hydraulic cylinder 9 is pivotally connected with one end of the bar 4 to which is secured a rod 12 movable in a guide 13 pivotally connected with the frame 2.

Pivotally connected to the other end of the bar 4 is the rod of the hydraulic cylinder 10 and a rod 15 movable in a guide 16 rigidly secured in the frame 2.

In order to provide for following the espalier canopy during the harvester movement along the row middles, on the housing 17 of the cutting apparatus 3 are secured spring-biased arms 18 and 19 contacting the espalier canopy, the arms 18 being adapted to follow the espalier canopy and connected with two-valve distributors 20 of a hydraulic system 21 for control over the hydraulic cylinders 9 and 10.

The arms 19 are likewise connected to the two-valve distributors 20 and serve to switch the latter on and off while the cutting apparatus 3 moves in and out under the espalier canopy.

The design of the two-valve distributor and its operation in conjunction with the cutting apparatus has been disclosed in detail in an earlier U.S. Pat. application Ser. No.681,435, now U.S. Pat. No. 3,563,016 for a "Follow-Up System of a Grape Harvester" by the same applicants and, therefore, is is not described herein.

When harvesting grapes from inclined trellises, the carrier bar 4 is provided with a guide chute 22 (FIG. 1) secured thereon and designed to pass the cut-off clusters of grapes onto a receiving conveyor 23.

From the latter conveyor, the clusters are transmitted via cross conveyor 24 to a receiving hopper 25 of the grape harvester.

During the transfer of the clusters from the receiving conveyor 23 to the cross conveyor 24, the grape leaves are separated under the effect of air delivered by a fan 26.

The grape harvester according to the present invention operates in the following manner.

Prior to the grape harvester entry into the middle row, and depending upon the type of the espalier canopy (inclined or horizontal) and the length of the grape cluster stems (brand of grapes), the cutting apparatus 3 is set on the frame 2 with the aid of the carrier bar 4 so that the longitudinal axis $a-a$ of said cutting apparatus forms an acute angle $\alpha$ with a plane normal to the direction of the harvester movement. The value of the angle $\alpha$ is selected to be within the range of from 0° to 45°. Following the setting of the cutting apparatus 3 with the carrier bar 4, the latter is clamped in the frame 2 with the aid of set bolts (not shown).

When so doing, the upper end of the cutting apparatus 3 is arranged in front relative to the lower end thereof with respect to the direction of the harvester movement.

Following the setting of the cutting apparatus at the angle $\alpha$ said apparatus is set on the carrier bar 4 (FIG. 3) at an acute angle $\beta$ to a plane superposable upon the espalier canopy. The value of this latter angle is selected to be in the range of from 0° to 25° and depends upon the type of espalier and the length of cluster stems. The adjustment of the angle $\beta$ is effected by turning the cutting apparatus 3 on the carrier bar 4 about the pivot 7 and locking it in this position by means of retaining nuts (not shown).

As the harvester enters the vineyard row, the hydraulic system is actuated from the chassis, and the cutting apparatus 3 is brought under the espalier canopy.

The spring-biased arms 19 in contact with the espalier canopy during the forward movement of the harvester bring the two-valve distributors 20 to the operating position. When so doing, the working fluid forced by the pump of the chassis 1 along the pipes of the hydraulic system 21 will be supplied to said distributors 20.

In this case, the hydraulic jacks 9 and 10 act to lift the bar 4 with the cutting apparatus 3 under the espalier canopy and to bring the cutting edges of the blades 6 of the cutting apparatus 3 close to the cluster stems. Concurrently, the spring-biased arms 18 are brought under the espalier canopy. With further elevation of the bar 4 with the cutting apparatus 3, the reaction of the canopy to the forces of pressure exerted by the bar 4 will be transmitted to the spring-biased arms 18.

The spring-biased arms 18 adapted to follow the espalier canopy will transmit to the two-valve distributors the pressure from the canopy reaction and, as a result, the supply of the working fluid to the hydraulic jacks will cease, as well as the upward movement of the bar 4.

During the subsequent forward movement of the grape harvester along the row, the spring-biased arms 18 provide for an accurate following by the carrier bar 4 and, consequently, by the cutting apparatus 3, of irregularities of the surface of the espalier canopy.

The conveyor 5 (FIG.3) with the blades 6 of the cutting apparatus 3 is driven by means of the hydraulic motor 8, the latter being set to rotation by the working fluid delivered via the pipelines of the hydraulic system 21.

The direction of movement of the conveyor 5 with the blades 6 is indicated by arrow C, as shown in FIG. 2.

When the bar 4 with the cutting apparatus 3 is pressed against the espalier canopy in the course of the forward movement of the grape harvester along the vineyard row middle, there takes place the cutting off of clusters of grapes by the cutting edges of the blades 6 of said cutting apparatus across the stems in a downward direction.

Such an effect is attained by setting the cutting apparatus 3 at an angle $\alpha$ during unsupported cutting and provides for the withdrawal of the blade edge, after a cluster has been cut, without cutting the adjacent lower cluster, while the cut cluster is separated to make room for the cutting apparatus with the carrier bar, whereby the cutting edge of the blade can approach the next lower cluster.

In addition, the setting of the cutting apparatus 3 the carrier bar 4 with its cutting plane arranged at an angle $\beta$ to the plane superposable upon the vineyard espalier canopy helps bring the cutting edges of the blades 6 under the roots of stems of the grape clusters.

Were the cutting apparatus to be arranged in parallel with the plane superposed upon the espalier canopy, and even close to said plane, the thickness of said apparatus exceeding the length of a grape cluster stem would result in damage done to the clusters by the blades and, consequently, in crop losses.

In addition to the aforesaid, the setting of the cutting apparatus 3 at angles α and β, in combination with the above-mentioned monitoring system, helps compensate for the tilting of the grape harvester in the course of moving along the row middle due to irregularities of the soil contour there and, consequently, results in the minimum damage to clusters of grapes and insures a marketable appearance of the crops.

The cut-off clusters fall down onto the guide chute 22 and thence onto the conveyor 23.

From the conveyor 23, the cut-off clusters are fed by means of the cross conveyor 24 to the receiving hopper 25 of the grape harvester.

While the grapes are transferred from the conveyor 23 to the cross conveyor 25, the grape leaves cut off together with the clusters are separated under the effect of air delivered by means of the fan 26.

The harvested grapes are reloaded from the hopper 25 into a transporting vehicle and carried to a primary processing station.

What is claimed is:

1. A grape harvester for harvesting clusters of grapes having stems, said harvester comprising: a chassis for moving in a selectable direction of movement along row middles of the vineyard; a frame arranged on said chassis; a carrier bar mounted on said frame adapted for turning in vertical and horizontal planes; means for turning said bar; a blade cutting apparatus including blades and mounted on said carrier bar so that its longitudinal axis of symmetry forms an acute angle ($\alpha$) with a plane normal to the direction of movement of said chassis in order to provide for cutting a cluster of grapes across its stem; said cutting apparatus having upper and lower ends, said acute angle ($\alpha$) being adjustable depending upon the type of espalier and the brand of grapes; means for the adjustment of said acute angle; the upper end of said cutting apparatus arranged in front with respect to the direction of the harvester movement in the cutting position to provide for moving the blades of said cutting apparatus across the stem in a downward direction; said cutting apparatus being mounted on said carrier bar at an acute angle ($\beta$) to a plane superposable upon the espalier canopy to provide for moving the cutting edges of the blades of said cutting apparatus under the roots of the stems of clusters of grapes.

2. A grape harvester as claimed in claim 1, wherein the angle $\alpha$ between the axis of symmetry of the cutting apparatus and the plane normal to the direction of the chassis movement is in the range of from 0° to 45°.

3. A grape harvester as claimed in claim 1, wherein the angle $\beta$ between the cutting apparatus and the plane superposable upon the espalier canopy is in the range of from 0° to 25° and depends upon the length of the stems of grape clusters.

* * * * *